United States Patent [19]

Yada et al.

[11] Patent Number: 5,297,843
[45] Date of Patent: * Mar. 29, 1994

[54] WINDOW MOLDING FOR AUTOMOBILE

[75] Inventors: Yukihiko Yada; Yasuhiro Wato, both of Ohbu, Japan

[73] Assignee: Tokai Kogyo Co. Ltd., Aichi, Japan

[*] Notice: The portion of the term of this patent subsequent to Sep. 22, 2009 has been disclaimed.

[21] Appl. No.: 51,574

[22] Filed: Apr. 22, 1993

Related U.S. Application Data

[60] Continuation-in-part of Ser. No. 907,837, Jul. 2, 1992, abandoned, which is a division of Ser. No. 719,834, Jun. 24, 1991, Pat. No. 5,149,168.

[30] Foreign Application Priority Data

Jun. 25, 1990 [JP] Japan .................. 2-166138
Jun. 25, 1990 [JP] Japan .................. 2-166139

[51] Int. Cl.$^5$ .............................. B60J 10/02
[52] U.S. Cl. .................. 296/146.15; 296/93
[58] Field of Search ............ 296/93, 201, 208, 213, 296/146.15; 52/208

[56] References Cited

U.S. PATENT DOCUMENTS

| | | | |
|---|---|---|---|
| 4,833,847 | 5/1989 | Inayama et al. | 296/201 X |
| 5,149,168 | 9/1992 | Yada et al. | 296/200 X |

FOREIGN PATENT DOCUMENTS

| | | | |
|---|---|---|---|
| 2120055 | 11/1971 | Fed. Rep. of Germany | 296/93 |
| 3323006 | 1/1985 | Fed. Rep. of Germany | 296/201 |
| 89417 | 5/1983 | Japan | 296/93 |
| 34222 | 2/1988 | Japan | 296/201 |

Primary Examiner—David M. Mitchell
Assistant Examiner—Gary C. Hoge
Attorney, Agent, or Firm—Flynn, Thiel, Boutell & Tanis

[57] ABSTRACT

A window molding for an automobile, adapted to be mounted in an endless manner in a space defined between the outer periphery of a rear window glass and the inner periphery of a rear window opening of a body of the automobile, so as to trim and seal said space, the body of the window molding being formed with a planar cover portion projecting from the portion of the molding body that is to be mounted on a lower portion of the rear window glass so as to elastically abut against a lower panel forming the rear opening, whereby the entirety of the rear window glass can be trimmed and sealed by the window molding as a single part.

12 Claims, 7 Drawing Sheets

WINDOW MOLDING FOR AUTOMOBILE

This application is a continuation in part of U.S. Ser. No. 07/907,837, filed Jul. 2, 1992, now abandoned, which is a division of U.S. Ser. No. 07/719,834, filed Jun. 24, 1991, now U.S. Pat. No. 5,149,168.

BACKGROUND OF THE INVENTION

1. Field of the Invention

This invention relates to a window molding for an automobile adapted to be mounted in an endless manner in the space defined between the outer periphery of the rear window glass and the inner periphery of the rear window opening in the body of the automobile so as to garnish and seal the space.

2. Description of the Prior Art

A conventional window molding adapted to be mounted on the outer periphery of the rear window glass of an automobile is comprised of two kinds of molded parts, that is, a first molded part which is mounted on the upper portion and the opposite side portions of the rear window glass and a second molded part which is mounted on the lower portion of the rear window glass. This construction is used so that the trunk panel is capable of being upwardly opened in the vicinity of the lower portion of the rear window glass.

Figure 6:
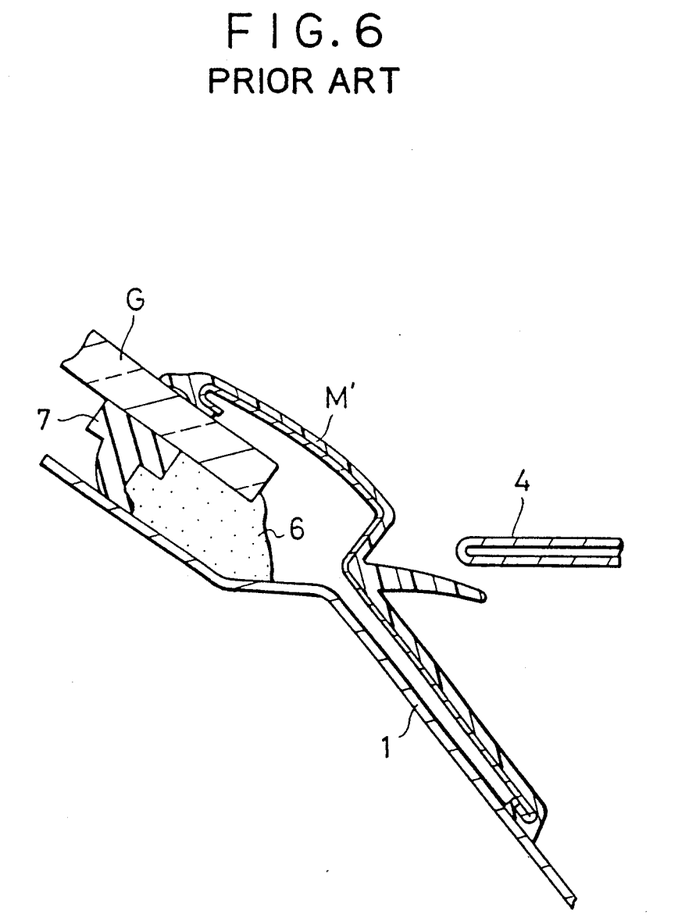
FIG. 6 is a sectional view of a prior art window molding.

The first molded part has a structure such that it can be fitted on the outer periphery of the rear window glass, and the outer edge of the garnish or trim portion of the first molding part is adapted to elastically abut against and sealingly contact the roof panel of the automobile. However, as shown in FIG. 6, the second molded part M', which is mounted on the lower portion of the rear window glass G, is bonded over a wide area to both the rear window glass G and the lower panel 1 of the automobile, so that the lower portion of the rear window glass G and the peripheral area therebelow are concealed by the second molding part M'.

The construction of the conventional automobile rear window molding has the following shortcomings.

(1) The molding consists of two parts having different cross-sectional shapes, and the two parts are connected together at two joint portions. The joint portions usually are provided on opposite sides of the lower portion of the rear window glass. Accordingly, these joint portions detract from the appearance of the automobile;

(2) Because the cross-sectional shapes of the two molded parts are widely different from each other, large steps and gaps are present at each joint portion. Accordingly, such large steps and gaps result in accumulation of dirt and/or generation of noise due to rapid changes in air flow therepast during running of the automobile;

(3) Because it is necessary to form two kinds of molded parts having widely different cross-sectional shapes, different molding dies and associated equipment are required for molding the two kinds of molded parts, resulting in an increase in the manufacturing cost; and (4) Because the two kinds of molded parts are connected together at the two joint portions, and the cross-sectional shapes of the molding parts are widely different, the number of mounting steps required for mounting the molded parts to the roof panel and the lower panel of the automobile is increased.

It is, accordingly, an object of the present invention to overcome the above problems in the conventional rear window moldings and simultaneously ensure a smooth opening and closing operation of the trunk of the automobile by employing a single molding for trimming the entirety of the outer periphery of the rear window glass.

According to the present invention, for achieving the above object, there is provided a window molding for an automobile adapted to be mounted, in an endless fashion, in the space defined between the outer periphery of the rear window glass and the inner periphery of the rear window opening in the body of said automobile so as to trim and seal said space, in which the body of the window molding, which molding is to be mounted on the entirety of the outer periphery of said rear window glass, is formed with a planar cover portion projecting from only the portion of said molded body that is to be mounted on the lower portion of the rear window glass so as to elastically abut against the lower panel forming the rear opening.

The planar cover portion is formed to project from the molded body of the window molding only at the lower portion of the molded body in which the lower portion of the rear window glass is mounted. Accordingly, the entirety of the outer periphery of the rear window glass can be trimmed and bordered by the molding which is formed as a single part having a single joint portion. Further, because the cover portion of the molded body projects to the lower panel of the automobile body and elastically abuts against the lower panel, the lower portion of the rear window glass and the peripheral area thereof can be concealed by the cover portion.

BRIEF DESCRIPTION OF DRAWINGS

There will now be described a plurality of preferred embodiments of the present invention with reference to the accompanying drawings, in which.

DETAILED DESCRIPTION

Figure 1:
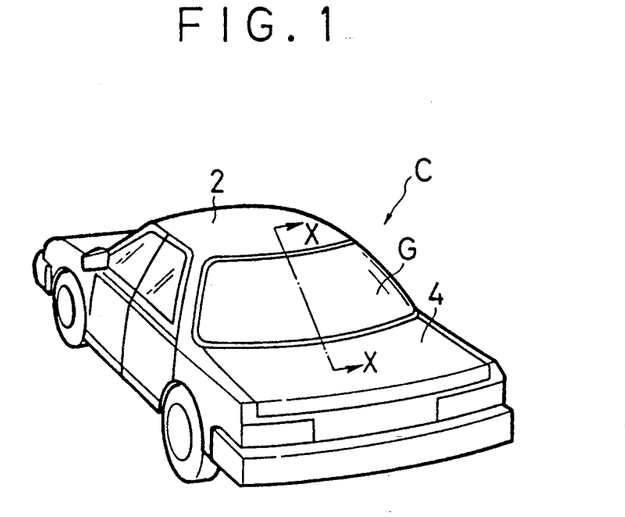
FIG. 1 is a perspective view of an automobile C as viewed from the rear end thereof.
Figure 2:
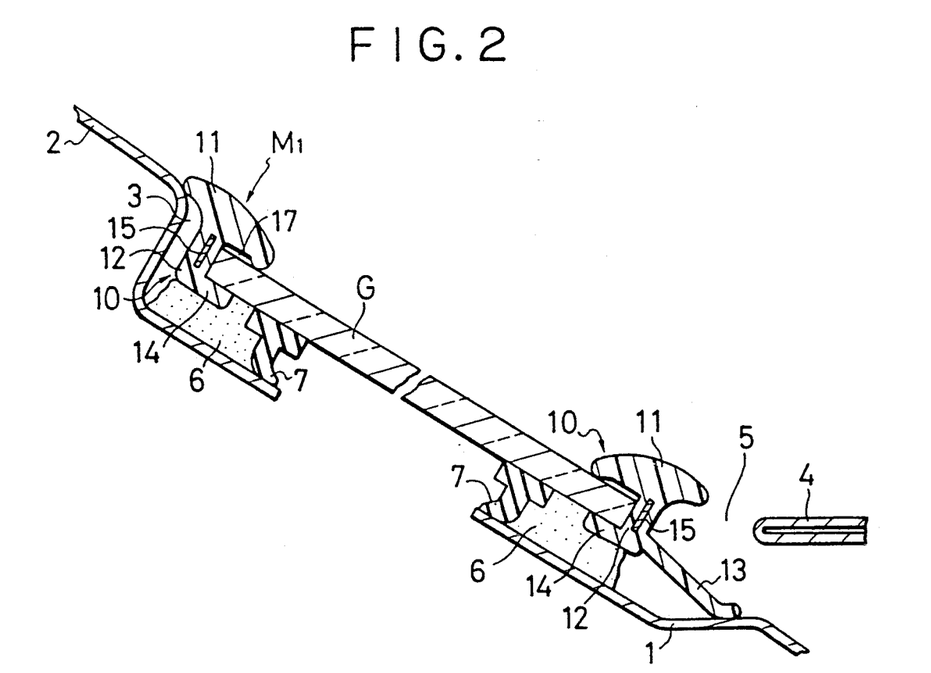
FIG. 2 is an enlarged cross-sectional view taken along the line X—X in FIG. 1.
Figure 3:
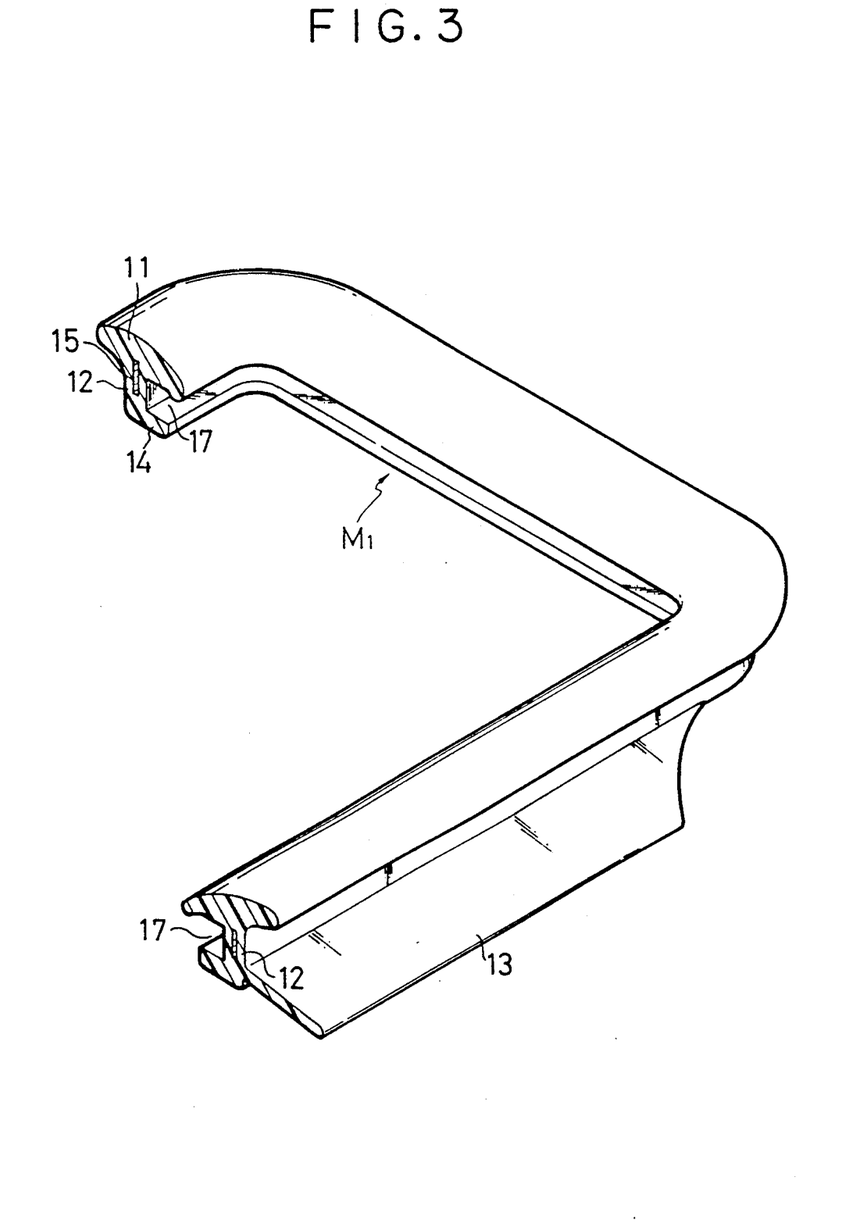
FIG. 3 is a perspective view of the molding $M_1$ of FIG. 2.

Referring to FIG. 1, a rear window glass G is provided in a rear window opening defined by a roof panel 2 and a lower panel 1 (FIG. 2) of the automobile C. An endless molding $M_1$ is mounted in the space defined between the outer periphery of the rear window glass G and the inner periphery of the above-mentioned rear window opening. The body 10 of the molding $M_1$ is of one-piece integral construction and it is comprised of a garnish or trim portion 11, a column portion 12 projecting downwardly from the lower surface of the trim portion 11, and a fitting portion 14 projecting inwardly from the lower end of the column portion 12, thus forming a substantially U-shaped configuration in cross-section. A fitting groove or channel 17 is provided on an inner periphery of the molded body 10 by the above-mentioned U-shaped configuration. The channel 17 is continuous along the entire length of molding $M_1$ so that the molding will form a continuous border on the perimeter of rear window glass G. As best shown in FIG. 3, at only the lower portion of the molded body 10, that is, the portion that is to be fitted on the lower edge portion of the rear window glass G, the molded body 10 is integrally formed with a substantially planar cover portion 13 which projects away from the window glass G and toward the lower panel 1 and elastically abuts against the same (FIG. 2). The outer periphery of the rear window glass G is fitted in the fitting groove 17 of the molded body 10, so that the molding $M_1$ is mounted on and borders the entirety of the outer periphery of the rear window glass G. A thin metal reinforcing sheet 15 is embedded in the column portion 12.

Because the cover portion 13 projects from the lower portion of the molded body 10 that is mounted on the lower edge portion of the rear window glass G, the cross-sectional shape of the molding $M_1$ does not change greatly, as a whole.

A space 3 is defined between the roof panel 2 and the portion of the outer periphery of the rear window glass G, which space extends along the upper portion and the opposite side portions of the rear window glass. The molding $M_1$ is mounted in the space 3 so as to seal and trim the upper edge portion and side edge portions of the periphery of the space 3 in such a manner that the periphery of the trim portion 11 elastically abuts against the roof panel 2.

On the other hand, a space 5 is defined between the lower portion of the rear window glass G and a trunk panel 4. However, as the trunk panel 4 is adapted to be upwardly opened, the space 5 cannot be concealed or covered by the trim portion 11 of the molding $M_1$. To cope with this, according to the preferred embodiment of the present invention, the planar cover portion 13 is formed to project from the vicinity of the lower end of the column portion 12 of the molded body 10 to the lower panel 1 and to elastically abut against the lower panel 1. With this construction, the lower portion of the rear window glass G and the peripheral area thereof can be concealed by the cover portion 13, with the space 5 simultaneously permitting the movement of the trunk panel 4 defined.

Figure 4:
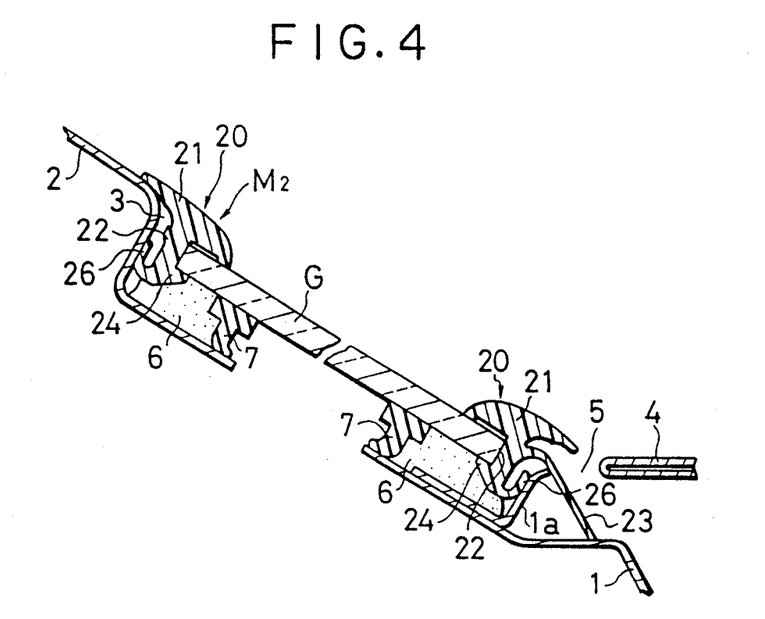
FIG. 4 is a view like FIG. 2 and showing a second embodiment of the invention.

In FIGS. 2 and 3, reference numeral 6 designates an adhesive for fixing the rear window glass G to the lower panel 1 and the roof panel 2, and reference numeral 7 designates a rubber dam for preventing the adhesive 6 from flowing away A second preferred embodiment of the present invention is shown in FIG. 4. Referring to FIG. 4, an auxiliary panel 1a having an upstanding wall is provided on the lower panel 1 An elastic lip 26 projects outwardly from the lower end of the column portion 22 of the molding $M_2$. The lip 26 elastically abuts against the upstanding wall of the auxiliary panel 1a with a large elastic deformation. With this construction, until the adhesive 6 is hardened, the molding $M_2$ is prevented from disengaging from the rear window glass G by the reaction force of the elastic lip 26. Further, the cover portion 23 projects outwardly from the vicinity of the upper end of the column portion 22 so as to conceal the auxiliary panel 1a and elastically abut against the lower panel 1. In FIG. 4, reference numerals 20, 21 and 24 designate the molding body, the trim portion and the fitting portion of the molding $M_2$, respectively.

Figure 5:
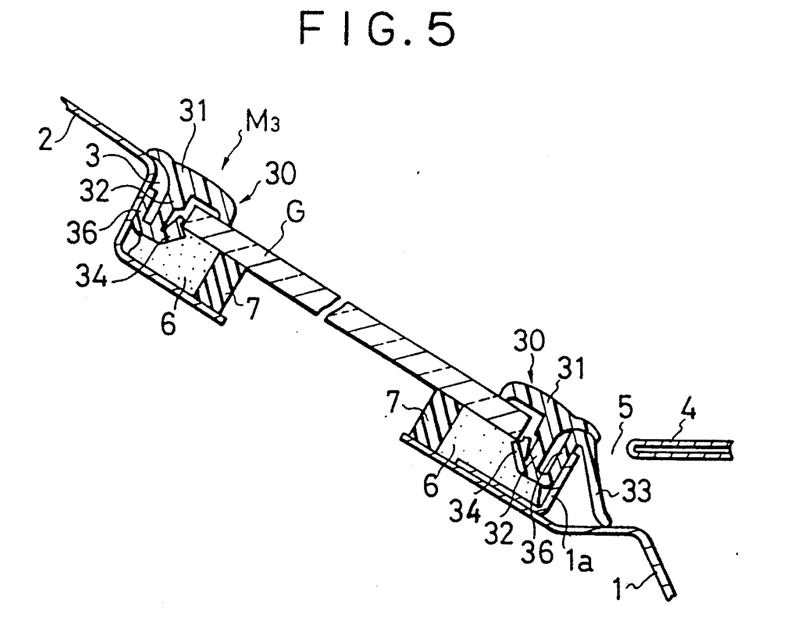
FIG. 5 is a view like FIG. 2 and showing a third embodiment of the invention.

A third preferred embodiment of the present invention is shown in FIG. 5. Referring to FIG. 5, an elastic lip 36 projects outwardly from the lower end of the column portion 32 of the molding $M_3$, and a cover portion 33 is integrally formed so as to extend from the elastic lip 36 to the lower panel 1. Further, another elastic lip 34 is formed to project inwardly from the lower end of the column portion 32, so that the outer periphery of the rear window glass G is held by and between the elastic lip 34 and the trim portion 31 of the molding $M_3$. In FIG. 5, reference numeral 30 designates the molded body of the molding $M_3$.

Figures 7, 8:
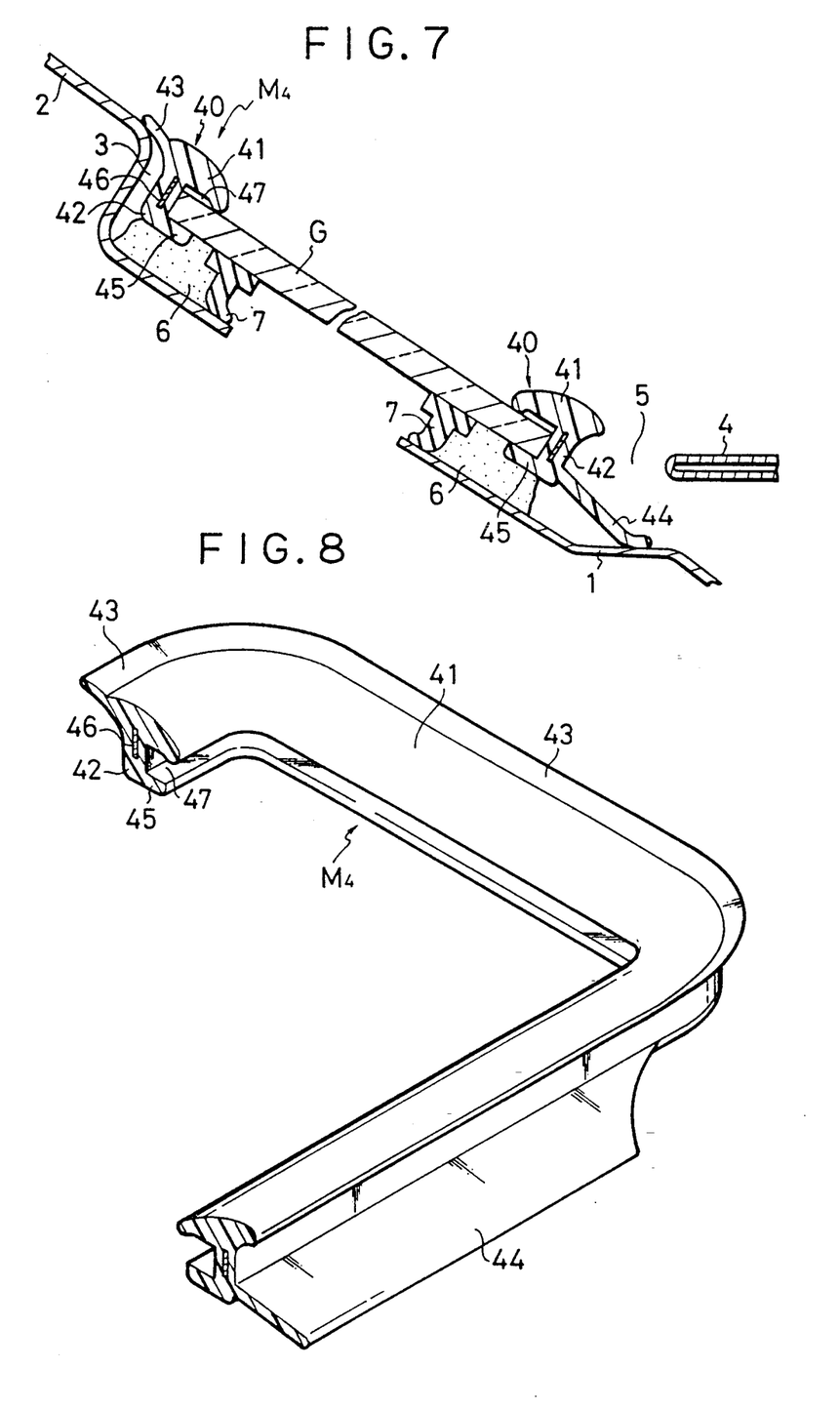
FIG. 7 is a view like FIG. 2 and showing a fourth embodiment of the invention.
FIG. 8 is a view like FIG. 3 and showing the fourth embodiment of the invention.

A fourth preferred embodiment of the present invention is shown in FIGS. 7 and 8. The molded body 40 is further formed with a seal portion 43 which projects outwardly from the upper trim portion 41. The seal portion 43 is adapted to sealingly engage the panel 2 along the upper edge portion and the two opposite side edge portions of the rear window glass G. However, the seal portion 43 is not present on the lower edge portion of the molded body 40. The planar cover portion 44 projects from the vicinity of the lower end of the column portion 42 of the molded body 40 to the lower panel 1 and elastically abuts against the lower panel 1. The seal portion 43 is omitted at only the lower portion of the molded body, that is, the portion that has the planar cover portion 44.

Reference numbers 45, 46 and 47 identify the fitting portion, the thin metal reinforcing sheet and the fitting groove, respectively.

With this construction, the lower portion of the rear window glass G and the peripheral area thereof can be concealed by the cover portion 44 with the space 5 permitting the movement of the trunk panel 4. At the same time, the space 5 defined between the trim portion 41 and the trunk panel is widened to thereby ensure smooth opening and closing operation of the trunk panel 4.

Figure 9:
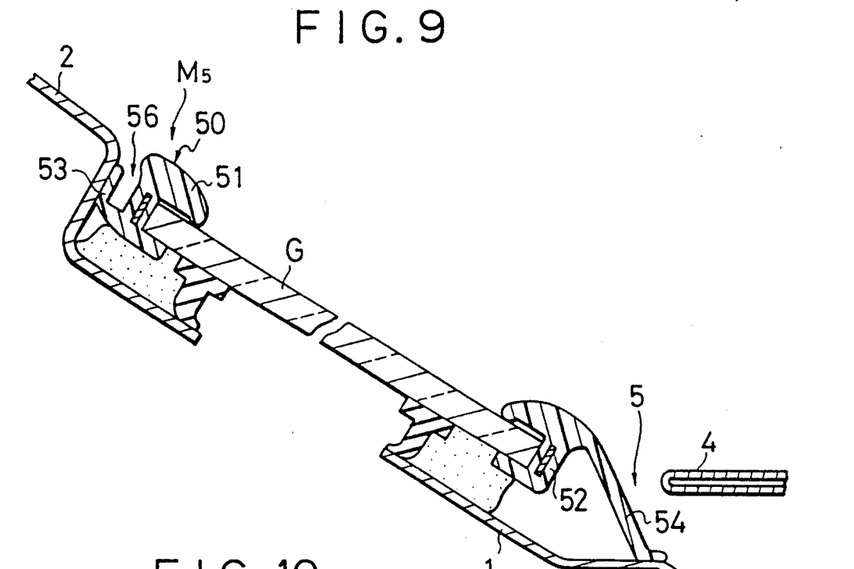
FIG. 9 is a view like FIG. 2 and showing a fifth embodiment of the invention.
Figure 10:
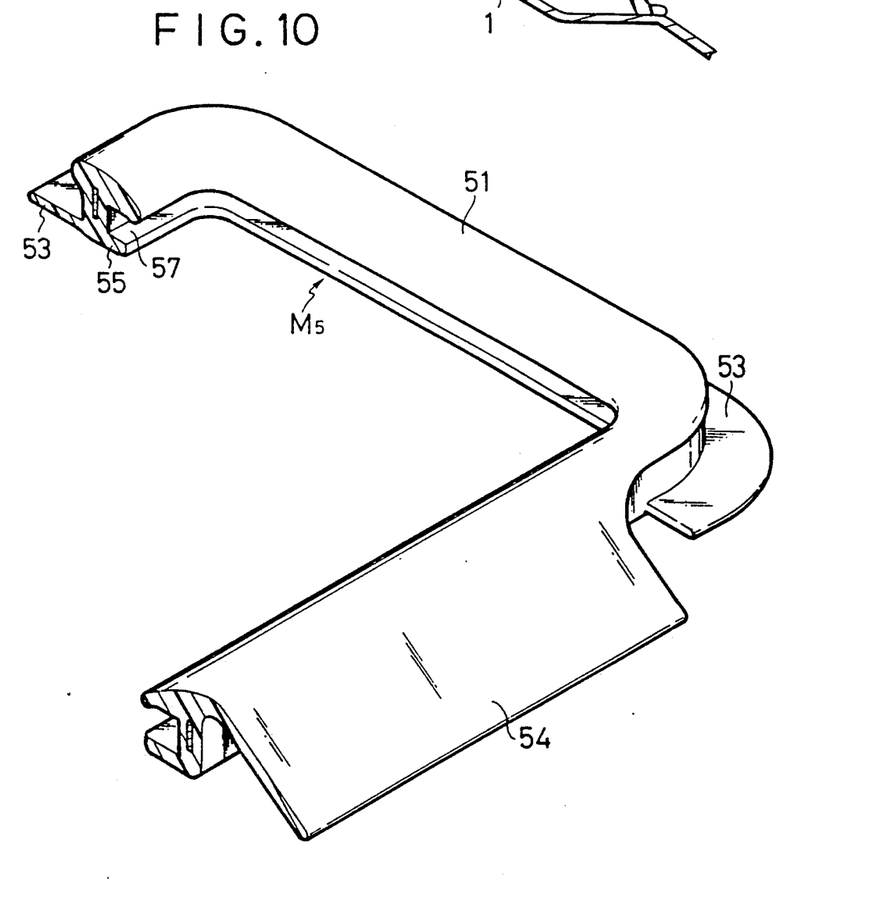
FIG. 10 is a view like FIG. 3 and showing the fifth embodiment of the invention.

A fifth preferred embodiment of the present invention is shown in FIGS. 9 and 10. The molded body 50 is further provided with a lower, outwardly projecting flange 53 which projects outwardly from the lower portion of the column 52. The flange 53 is bent into a substantially L-shaped configuration and 53 sealingly engages the upright wall portion of the panel 2, along the upper edge portion and the two opposite side edge portions of the rear window glass G. However the flange 53 is not present on the lower edge portion of the molded body 50. The planar cover portion 54 projects from the vicinity of the upper end of the column portion 52 of the molded body 50 to the lower panel 1 and elastically abuts against the lower panel 1. The flange 53 is omitted only at the lower portion of the molded body, that is, the portion that has the planar cover portion 54.

With this construction, the L-shaped flange 53 and the opposing portion of the column 52 define an upwardly opening channel 56 in which rain can be collected. The flange 53 need not necessarily be provided at the lower end of column 52, but rather, it can be provided at any suitable vertical position along the column 52 so long as the channel 56 is formed. Thus, rain that falls on panel 2 can flow into channel 56, travel therealong to the lower portion of the window opening and then can flow onto the panel 1. Also, the space 5 between the trunk panel 5 and the planar flange portion 54 can be reduced.

Figure 11:
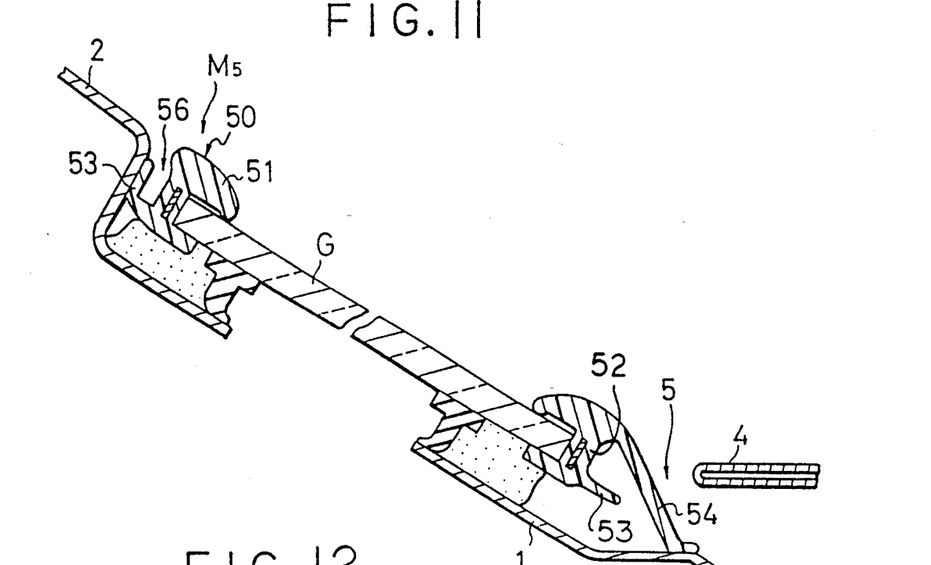
FIGS. 11 and 12 respectively correspond to FIGS. 9 and 10 but show a variation of the fifth embodiment of the invention.
Figure 12:
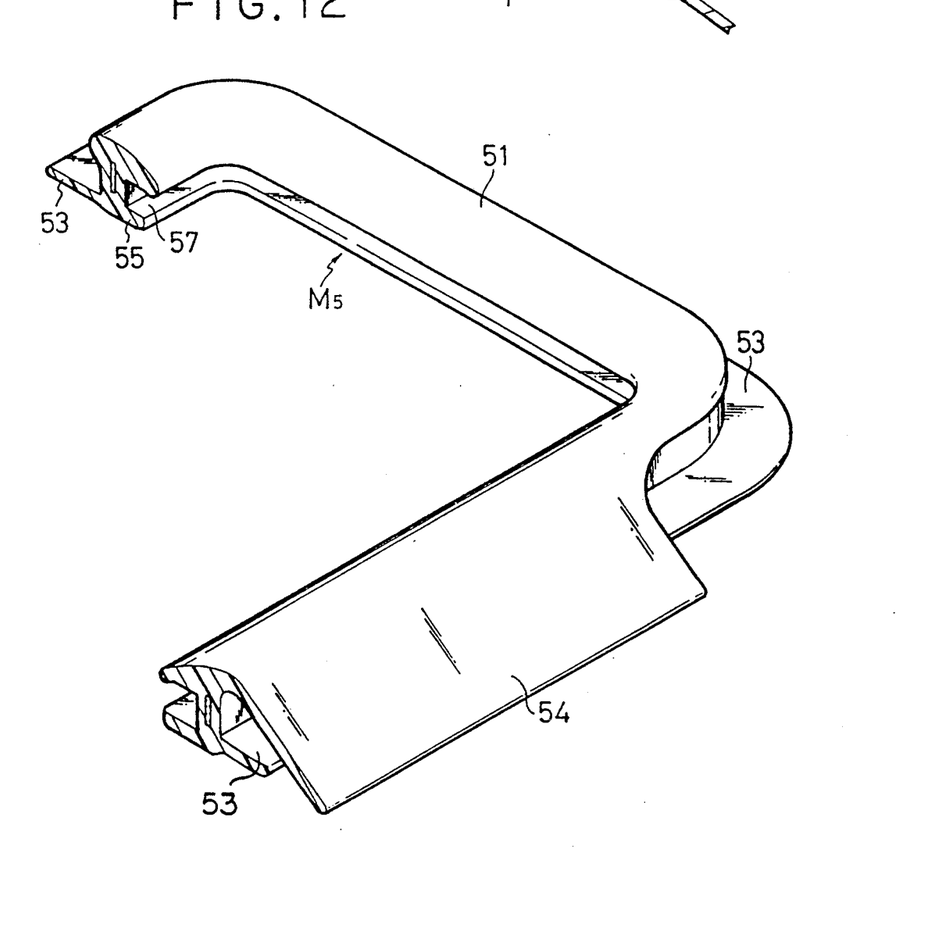

Referencing now FIGS. 11 and 12, there is illustrated a variation of the fifth embodiment shown in FIGS. 9 and 10, and in fact FIGS. 11 and 12 closely and respectively correspond to FIGS. 9 and 10 and hence the same reference numerals have been utilized therein to designate the same parts. In this variation of FIGS. 11 and 12, however, the lower outwardly projecting flange 53 which projects outwardly from the lower portion of the column 52 is also provided along that section of the column with which the planar cover portion 54 is provided.

According to the present invention, the planar cover portion 14, 24, etc. is formed to project from the molded body so as to elastically abut against the lower panel only at the lower portion of the molded body. Accordingly, the molded body has no large change in cross-sectional shape considered as a whole. Further, the entirety of the outer periphery of the rear window glass can be trimmed by a single molding having a single joint portion, and no large steps and gaps are created at the joint portion. Therefore, the appearance of the molding mounted on the rear window glass can be improved.

As the entirety of the outer periphery of the rear window glass can be trimmed by a single molding, the number of molding dies and associated equipment can be reduced to thereby reduce the manufacturing cost for the molding. Moreover, because only a single joint portion of the molding is needed, the number of steps involved in mounting the molding to the roof panel and the lower panel of the automobile is reduced.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an automobile having a rear window mounted in a rear window opening of the automobile body, a window molding mounted in a space between an outer periphery of the rear window of the automobile and an inner periphery of the rear window opening of the automobile body, said molding having wall means sealingly engaged with said inner periphery and said outer periphery along upper, lower and side edges of said rear window so as to seal and trim said space, said molding having a substantially planar, elastic, flange portion projecting from only a section of said molding that extends along the lower edge of said rear window, said flange portion elastically abutting against a panel forming the lower edge of said rear window opening, said molding also having a column portion extending alongside the edge of and perpendicular to said rear window and a lower, outwardly extending flange sealingly engaging an upright wall on the inner periphery of the rear window opening of the automobile, said lower, outwardly extending flange and said column portion defining an upwardly opening channel along an upper edge and two opposite side edges of said rear window opening, said section of said molded body being free of said lower, outwardly extending flange.

2. An automobile as claimed in claim 1 in which said molding has an upper trim portion including an upper, inwardly extending flange overlying and sealed against an outer surface of an outer peripheral edge portion of the rear window, said column portion projecting downwardly from said upper trim portion and a lower, inwardly extending flange underlying and sealed against an inner surface of said outer peripheral edge portion of the rear window, said upper flange, said column portion and said lower flange defining a continuous channel encircling the rear window glass and providing a substantially continuous border thereon, said flange portion projecting outwardly from said column portion only in said section of said molding, the remainder of said molding being free of said flange portion, said flange portion extending a substantial distance beyond an outer edge of said upper trim portion in said section of said molding.

3. An automobile as claimed in claim 2 in which said molding has a constant cross-section throughout its length except in said section of said molding.

4. An automobile as claimed in claim 2 in which said flange portion projects outwardly from the upper edge of said column portion in said section of said body.

5. In a window molding for an automobile, comprising a molded body adapted to be mounted in a substantially endless manner in a space defined between an outer periphery of a rear window glass of the automobile and an inner periphery of a rear window opening of an automobile body, said molded body having wall means sealingly engageable with said inner periphery and said outer periphery so as to seal and trim said space, the improvement which comprises: said molded body includes a substantially planar, elastic, flange portion projecting from only a section of said molded body that is to extend along a lower edge of said rear window glass, said flange portion being adapted to elastically abut against a panel forming a lower edge of said rear window opening, an upper trim portion including an upper, inwardly extending flange adapted to overlie and seal against an outer surface of an outer peripheral edge portion of the rear window glass, a column portion projecting downwardly from said upper trim portion and a lower, inwardly extending flange adapted to underlie and seal against an inner surface of said outer peripheral edge portion of the rear window glass, said upper flange, said column portion and said lower flange defining a substantially continuous channel for encircling the rear window glass and providing a substantially continuous border thereon, said flange portion projecting outwardly from said column portion only in said section of said molded body, the remainder of said molded body being free of said flange portion, said flange portion extending a substantial distance beyond an outer edge of said upper trim portion in said section of said molded body, said molded body also having a lower, outwardly extending flange adapted to sealingly engage an upright wall on the inner periphery of the rear window opening of the automobile, said lower, outwardly extending flange and said column portion defining an upwardly opening channel along an upper edge and two opposite side edges of said rear window opening.

6. A window molding as claimed in claim 3 in which said molded body has a constant cross-section throughout its length except in said section of said molded body.

7. A window molding as claimed in claim 5 in which said flange portion projects outwardly from the upper edge of said column portion in said section of said body.

8. A window molding according to claim 5, wherein said section of said molded body is free of said lower, outwardly extending flange.

9. A window molding according to claim 5, wherein said lower, outwardly extending flange also extends along said section of said molded body.

10. In an automobile having a rear window mounted in a rear window opening of the automobile body, a window molding mounted in a space between an outer periphery of the rear window of the automobile and an inner periphery of the rear window opening of the automobile body, said molding having wall means sealingly engaged with said inner periphery and said outer periphery along upper, lower and side edges of said rear window so as to seal and trim said space, said molding having a substantially planar, elastic, flange portion projecting from only a section of said molding that extends along the lower edge of said rear window, said flange portion elastically abutting against a panel forming the lower edge of said rear window opening, said molding also having a column portion extending alongside the edge of and perpendicular to said rear window and a lower, outwardly extending flange sealingly engaging an upright wall on the inner periphery of the rear window opening of the automobile, said lower, outwardly extending flange and said column portion defining an upwardly opening channel along an upper edge and two opposite side edges of said rear window opening.

11. An automobile as claimed in claim 10 in which said molding has an upper trim portion including an upper, inwardly extending flange overlying and sealed against an outer surface of an outer peripheral edge portion of the rear window, said column portion projecting downwardly from said upper trim portion and a lower, inwardly extending flange underlying and sealed against an inner surface of said outer peripheral edge portion of the rear window, said upper flange, said column portion and said lower flange defining a continuous channel encircling the rear window and providing a substantially continuous border thereon, said flange portion projecting outwardly from said column portion only in said section of said molding, the remainder of said molding being free of said flange portion, said flange portion extending a substantial distance beyond an outer edge of said upper trim portion in said section of said molding.

12. An automobile as claimed in claim 11, in which said flange portion projects outwardly from the upper edge of said column portion in said section of said body.

* * * * *

UNITED STATES PATENT AND TRADEMARK OFFICE
CERTIFICATE OF CORRECTION

PATENT NO. : 5 297 843

DATED : March 29, 1994

INVENTOR(S) : Yukihiko Yada et al

It is certified that error appears in the above-identified patent and that said Letters Patent is hereby corrected as shown below:

Column 6, line 63; change "claim 3" to ---claim 5---.

Signed and Sealed this

Sixteenth Day of August, 1994

Attest:

BRUCE LEHMAN

Attesting Officer    Commissioner of Patents and Trademarks